3,142,675
Patented July 28, 1964

3,142,675
NOVEL DERIVATIVES OF 3-CARBOXYBENZO-
THIAZOLENYLBENZOTHIAZOLYLALKANE
Charanjit Rai and John B. Braunwarth, Crystal Lake, Ill.,
assignors to The Pure Oil Company, Chicago, Ill., a
corporation of Ohio
No Drawing. Filed May 18, 1961, Ser. No. 110,859
9 Claims. (Cl. 260—240.7)

This invention relates to basic alkylthioalkyl esters of 3-carboxybenzothiazolenylbenzothiazolylalkanes and salts thereof.

Certain phenothiazine derivatives are known bactericides and/or bacteriostatic agents, and other oxygen-containing compounds are described as being active against gram-positive and gram-negative bacteria. The methoxy-N-methyl-morphinan hydrohalides are also known for their cough-soothing activity. The compounds of this invention possess potential utility as bactericides and/or bacteriostatic agents and exhibit much more activity against gram-positive and gram-negative bacteria than known bactericides. It also appears that the compounds of this invention have cough-soothing activity superior to known cough-soothing agents. Also, the compounds of this invention may be used in oil-wells.

In accordance with this invention, we have discovered as novel compounds the basic alkylthioalkyl esters of 3-carboxybenzothiazolenylbenzothiazolylalkanes and their salts. The novel basic esters of this invention are prepared by reacting the 3-carboxybenzothiazolenylbenzothiazolylalkane acid halide, with a basically substituted alkylthioalkanol. Accordingly, it becomes a primary object of this invention to provide basic alkylthioalkyl esters of 3-carboxybenzothiazolenylbenzothiazolylalkanes which correspond to the formula—

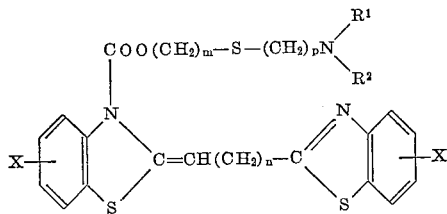

wherein $R^1$ and $R^2$ are substituents from the group of hydrogen and hydrocarbon radicals, $n$ is 0 or a whole number, $m$ and $p$ are whole numbers, and X may be a substituent of the group consisting of chlorine, bromine, hydrogen, methyl, ethyl, isopropyl, methoxy, ethoxy, amino and nitro radicals.

Another object of this invention is to provide a process for the preparation of novel compounds of the formula supra.

These and other objects of the invention will be demonstrated or become apparent as the specification proceeds.

The process of this invention is illustrated by the reaction of the acid or its halide with a basically substituted alkylthioalkanol and is illustrated by the following equation:

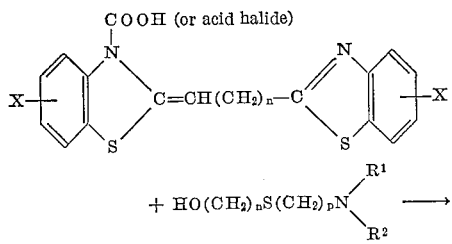

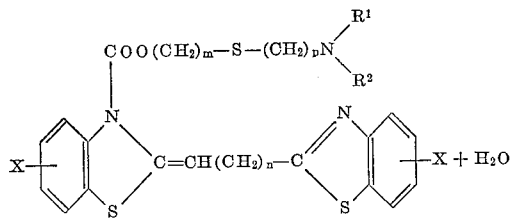

where X represents a radical from the above group, $n$ is 0 or a whole number and $m$ and $p$ are whole numbers. In order to illustrate the invention, the following examples are given:

EXAMPLE I

3 - carboxybenzothiazolenylbenzothiazolylmethane was prepared using the following sequence of steps:

Step 1.—Preparation of Methylenebisbenzothiazole Ethiodide

Methylenebisbenzothiazole was prepared by the polyphosphoric acid-catalyzed, intermolecular condensation of o-aminothiophenol and malonic acid. Equimolar quantities of methylenebisbenzothiazole and ethyl iodide were heated at 100° C., and the resulting yellow, crystalline mass was recrystallized from methyl alcohol. The recrystallized product, in the form of long, bright yellow needles, had a melting point of 245° C., and was found to contain 29.05% w. of iodine. Methylenebisbenzothiazole ethiodide ($C_{17}H_{14}N_2IS_2$) contains 29.0% w. iodine.

Step 2.—Preparation of 3-Ethylbisbenzothiazolenylbenzothiazolylmethane

Methylenebisbenzothiazole ethiodide (0.16 g.) was shaken for four hours with a 16% solution of sodium hydroxide (60 cc.) and ether (300 cc.). Then the ether was removed, and shaking was continued for two hours with fresh ether (300 cc.). Evaporation of the yellow ethereal solution left a residue which, when crystallized from alcohol, had a melting point of 163° C. Elemental analysis showed: carbon, 66.14%; hydrogen, 4.62%; and nitrogen, 9.17%. The desired product ($C_{17}H_{14}N_2S_2$) contains: carbon, 65.82%; hydrogen, 4.55%; and nitrogen, 9.03%.

A product of this invention is prepared from the product of Step 2 as follows:

Step 3.—Preparation of 3-Carboxybenzothiazolenylbenzothiazolylmethane

The 3 - methylbenzothiazolenylbenzothiazolylmethane (0.5 gram-mole) is oxidized by mixing it with potassium permanganate in alkaline medium and stirring, while heating at about 50° C. The potassium permanganate solution is added in small increments (2 g.) until the permanganate color no longer disappears. Then the mixture is filtered, and the filtrate is acidified with mineral acid to liberate the acid in crystalline form. The acid chloride is obtained by reacting the free acid with thionyl chloride.

Step 4.—Preparation of 2'-(Diethylaminoethylthioethyl)-Benzothiazolenylbenzothiazolylmethane-3-Carboxylate To a suspension of 3-carboxybenzothiazolenylbenzothiazolylmethane acid chloride (0.1 gram-mole) in 50 ml. of dry pyridine is added, dropwise and with stirring, a solution of β-diethylaminoethylthioethanol (0.1 gram-mole, 17.7 g.) in 50 ml. of pyridine, over a period of 30 minutes. Then the mixture is heated to 100° C. for one hour, and the solution is cooled and poured into 400 ml. of ice water. The ester then is liberated by adding sodium hydroxide, after which it is extracted with ether and washed with water to remove the pyridine. The ether is distilled from the mixture to obtain the ester as residue.

*Step 5.—Preparation of the Citrate Salt of 2'-(Diethylaminoethylthioethyl)Benzothiazolenylbenzothiazolylmethane-3-carboxylate*

The citrate salt of the ester is prepared by treating an ethereal solution of the ester with an equal weight of citric acid in acetone. The methyl bromide, maleic acid, and other salts may be prepared in the same manner.

EXAMPLE II

*Step 1.—Preparation of β-Diisopropylaminoethylthioethanol*

Diisopropylaminoethylchloride (81.7 g., 0.5 gram-mole) is dissolved in 100 cc. of methanol, and a solution of sodium methoxide (27.0 g., 0.5 mole) in 200 cc. of methanol is added to the solution with stirring. The resulting solution is filtered, and the filtrate is added dropwise to a solution of mercaptoethanol (29.0 g., 0.5 gram-mole) and sodium methoxide (27.0 g., 0.5 gram-mole) in 500 ml. of methanol.

This reaction mixture is heated and refluxed for 2½ hours, after which it is cooled, filtered, and distilled under reduced pressure to recover β-diisopropylaminoethylthioethanol having a boiling point of 100° C. at 0.3 mm. Hg absolute pressure.

*Step 2.—Preparation of 2'-(Diisopropylaminoethylthioethyl)Benzothiazolenylbenzothiazolylmethane - 3 - Carboxylate*

To 3 - carboxybenzothiazolenylbenzothiazolylmethane acid chloride (0.1 gram-mole) in 50 ml. of dry pyridine is added, with stirring, a solution of β-diisopropylaminoethylthioethanol in dry pyridine. The resulting ester is worked up as in Example I. Its citrate, maleate, alkyl bromide and other salts are prepared by mixing the reactants in acetone.

Using 2'-(dimethylaminoethylthioethyl) benzothiazolenylbenzothiazolylmethane-3-carboxylate maleate, one of the compounds of this invention, as an example, the following minimum inhibitory concentrations are predicted when the compound is used as a bacteriostatic agent against a representative group of bacteria:

| Bacteria | Minimum Inhibitory Concentrations [1] |
|---|---|
| *Staphylococcus pyogenes* (penicillin sensitive) | 4,000 |
| *Staphylococcus pyogenes* (penicillin resistant) | 4,000 |
| *Sarcina lutea* | 8,000 |
| *Streptococcus faecalis* | 8,000 |
| *Aerobacter aerogenes* | 2,000 |
| *Pseudomonas aeruginosa* | 4,000 |
| *Proteus vulgaris* | 2,000 |

[1] The minimum inhibitory concentration is defined as the number of parts of nutrient solution in which one part of the agent completely inhibits growth of the specific bacteria tested.

The staring materials for the reaction that can be used are:

3-carboxybenzothiazolenylbenzothiazolylpropane
3-carboxybenzothiazolenylbenzothiazolylbutane
3-carboxybenzothiazolenylbenzothiazolylpentane
3-carboxybenzothiazolenylbenzothiazolylhexane
3-carboxybenzothiazolenylbenzothiazolylheptane
3-carboxybenzothiazolenylbenzothiazolyloctane
3-carboxybenzothiazolenylbenzothiazolylnonane
3-carboxybenzothiazolenylbenzothiazolyldecane
3-carboxybenzothiazolenylbenzothiazolyleicosane
3-carbonylchloridebenzothiazolenylbenzothiazolylpropane
3-carbonylchloridebenzothiazolenylbenzothiazolylbutane
3-carbonylchloridebenzothiazolenylbenzothiazolylpentane
3-carbonylchloridebenzothiazolenylbenzothiazolylhexane
3-carbonylchloridebenzothiazolenylbenzothiazolylheptane
3-carbonylchloridebenzothiazolenylbenzothiazolyloctane
3-carbonylchloridebenzothiazolenylbenzothiazolylnonane
3-carbonylchloridebenzothiazolenylbenzothiazolyldecane and the corresponding bromide, iodide and fluoride compounds.

The foregoing starting materials illustrate that the invention is directed to a number of compounds under the generic formula supra to include such species as the following basic esters of 3-carboxybenzothiazolenylbenzothiazolylalkanes:

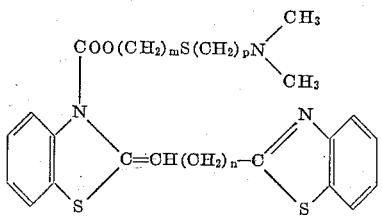

2'-(dimethylaminoethylthioethyl) benzothiazolenylbenzothiazolylmethane-3 carboxylate Other basic esters include:

2'-(diethylaminoethylthioethyl) benzothiazolenylbenzothiazolylmethane-3 carboxylate
2'-(dimethylaminopropylthioethyl) benzothiazolenylbenzothiazolylmethane-3 carboxylate
2'-(dibutylaminopropylthioethyl) benzothiazolenylbenzothiazolylethane-3 carboxylate
2'-(butylisopropylaminopentylthiooctyl) benzothiazolenylbenzothiazolyloctane-3 carboxylate The acid esters that are included are:

2'-(dimethylaminoethylthioethyl) benzothiazolenylbenzothiazolylmethane-3 carboxylate sulfate
2'-(dimethylaminobutylthiobutyl) benzothiazolenylbenzothiazolylethane-3 carboxylate nitrate
2'-(diisopropylaminooctylthiononyl) benzothiazolenylbenzothiazolylbutane-3 carboxylate carbonate
2'-(diheptylaminomethylthioeicosyl) benzothiazolenylbenzothiazolyleicosane-3 carboxylate phosphate Species of organic acid salts include:

2'-(dimethylaminoethylthioethyl) benzothiazolenylbenzothiazolylmethane-3 carboxylate citrate
2'-(dimethylaminoethylthioethyl) benzothiazolenylbenzothiazolylethane-3 carboxylate maleate
2'-(dimethylaminoethylthioethyl) benzothiazolenylbenzothiazolyloctane-3 carboxylate stearate
2'-(dimethylaminoethylthioethyl) benzothiazolenylbenzothiazolylpropane-3 carboxylate oxalate
2'-(dimethylaminoethylthioethyl) benzothiazolenylbenzothiazolylpentane-3 carboxylate gluconate
2'-(dimethylaminoethylthioethyl) benzothiazolenylbenzothiazolylmethane-3 carboxylate gallate
2'-(dimethylaminoethylthioethyl) benzothiazolenylbenzothiazolylethane-3 carboxylate butyrate
2'-(dimethylaminoethylthioethyl) benzothiazolenylbenzothiazolylpropane-3 carboxylate isovalerate
2'-(dimethylaminoethylthioethyl) benzothiazolenylbenzothiazolylbutane-3 carboxylate caproate
2'-(dimethylaminoethylthioethyl) benzothiazolenylbenzothiazolylpentane-3 carboxylate laurate
2'-(dimethylaminoethylthioethyl) benzothiazolenylbenzothiazolylnonane-3 carboxylate palmitate
2'-(diethylaminopropylthiobutyl) benzothiazolenylbenzothiazolylmethane-3 carboxylate oleate
2'-(diethylaminopropylthiobutyl) benzothiazolenylbenzothiazolyleicosane-3 carboxylate linoleate
2'-(diethylaminopropylthiobutyl) benzothiazolenylbenzothiazolylmethane-3 carboxylate formate
2'-(diethylaminopropylthiobutyl) benzothiazolenylbenzothiazolylpropane-3 carboxylate acetate
2'-(diethylaminopropylthiobutyl) benzothiazolenylbenzothiazolylbutane-3 carboxylate propionate A quaternary ammonium compound is the methobromide salt of 2'-(dipropylaminobutylthiopentyl) benzothiazolenylbenzothiazolylethane-3 carboxylate.

Products may also be produced wherein in the general structure

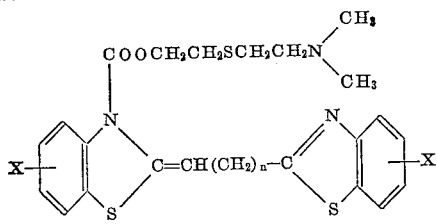

X is other than hydrogen. For example when X is chlorine in the 5 position, the product becomes 2'-(dimethylaminoethylthioethyl)4 - chlorobenzothiazolenyl 4-chlorobenzothiazolylmethane-3-carboxylate, and when X is amino in 6 position, the product becomes 2'-(dimethylaminoethylthioethyl)5 - aminobenzothiazolenyl 5'-(aminobenzothiazolylmethane-3-carboxylate.

In preparing the basic esters of this invention, as illustrative of the compounds from which the acid esters, organic acid salts, quaternary ammonium compounds, alkali metal salts, alkaline earth metal salts and alkane halide salts are derived, it is only necessary to react the acid or halide, i.e., 3-carboxybenzothiazolenylbenzothiazolylalkane, or 3-carbonylhalobenzothiazolenylbenzothiazolylalkane, with a basically substituted alkylthioalkanol such as ethylthioethanol, methylthioethanol, propylthioethanol, butylthioethanol, isopropylthiobutanol, butylthiobutanol, pentylthiomethanol, hexylthiobutanol, heptylthiopropanol, octylthiohexanol, nonylthiooctanol, etc. This reaction is readily carried out by bringing the reactants together in a diluent such as pyridine and applying heat to bring the mixture to a temperature of about 80° to 120° C. Stirring can be applied to facilitate the reaction. Upon completion of the reaction which takes about 30 minutes to 4 hours, the reaction mixture is cooled, and the free basic ester can be liberated by the addition of a base, such as sodium hydroxide or potassium hydroxide. Preferably the base is added as a 5% to 20% solution which is cooled to about 0° to 10° C., as by the addition of ice. Recovery of the basic ester is accomplished by extraction of the neutralized, cool reaction mixture with an organic extractant, such as ether, methyl ethylketone, carbon tetrachloride or the like. The solvent solution is washed with water at room temperature, and the free basic ester is recovered by evaporation of the solvent, preferably on a steam bath.

The acid addition salts of the basic esters are prepared by adding a slight excess of the acid to a solution of the free basic ester in a suitable solvent, such as the organic extractants previously mentioned. Where the mineral acid salt is desired, the reaction is accomplished in the same manner using the appropriate mineral acid hereinafter enumerated. The quaternary ammonium salts are prepared by reacting the basic ester with a solution of an alkyl halide, i.e., ethyl bromide, methyl bromide, ethyl iodide and the like. The same organic extractants as referred to herein may be used for this reaction. Similarly, the alkali metal salts and alkaline earth metal salts are prepared by treating the basic esters with a strong base such as sodium hydroxide, potassium hydroxide, lithium hydroxide, cesium hydroxide, calcium oxide, calcium hydroxide, barium hydroxide, barium oxide, magnesium oxide, magnesium hydroxide, and the corresponding carbonates.

To further illustrate these embodiments of the invention additional non-limiting examples are given:

EXAMPLE III

Following Step 4 of Example I, 2'-(butylisopropylamino pentylthiooctyl)benzothiazolenylbenzothiazolyloctane-3 carboxylate is prepared by reacting benzothiazolenylbenzothiazolyloctane-carbonyl chloride with butylisopropyl aminopentylthiooctanol in dry liquid ammonia with agitation at a temperature of about 140° C. for about 1 hour. The reaction mixture is cooled and poured into 500 ml. of ice water containing crushed ice. The product is separated as a solid by the addition of potassium hydroxide after which it is extracted with MEK and washed with water. The MEK solution is distilled from the mixture to obtain the ester as the solid residue. The residue from Example III is divided into 5 portions.

EXAMPLE IV

A portion of the ester residue of Example I is taken up in 100 ml. of butyl alcohol and reacted with barium hydroxide octahydrate in aqueous slurry with thorough agitation and heating slightly on a steam bath to prepare the barium salt of 2'-(butylisopropylaminopentylthiooctyl)benzothiazolenylbenzothiazolyloctane-3 carboxylate.

EXAMPLE V

A second portion of the residue of Example III is dissolved in ether and reacted with 20% aqueous sulfuric acid at a temperature of about 45° C. to form the sulfate salt of 2'-(butylisopropylaminopentylthiooctyl)benzothiazolenylbenzothiazolyloctane-3 carboxylate.

EXAMPLE VI

A third portion of the residue of Example III is dissolved in acetone and reacted with a 10% solution of gallic acid in acetone while heating on a steam bath to produce 2'-(butylisopropylaminopentylthiooctyl)benzothiazolenylbenzothiazolyloctane-3 carboxylate gallate.

EXAMPLE VII

A fourth portion of the residue of Example III is dissolved in either and reacted with an ether solution of ammonium chloride at the temperature of a steam bath to form the ammonium chloride salt of 2'-(butylisopropylaminopentylthiooctyl) benzothiazolenylbenzothiazolyloctane-3 carboxylate.

EXAMPLE VIII

The fifth portion of the residue of Example III is treated with gaseous ammonia while dissolved in pyridine to form the ammonia salt.

Each of the products prepared in Examples III to VIII has bactericidal and/or bacteriostatic properties. The sulfate and ammonium chloride salts have cough-soothing properties. All of the products may be used in oil wells as bactericides to inhibit the growth of slime-producing bacteria and sulfate-reducing bacteria, and thus inhibit pitting corrosion. The products may be used in flood waters for the foregoing purposes or in thickened flood waters for the foregoing purposes or in thickened flood waters containing thickening agents that are subject to bacterial attack, such as agar-agar, gum arabic, and the like. In some instances, the products of this invention may be used in petroleum oils and other media to inhibit bacterial growth which causes disintegration of the media.

The embodiments of the invention in which an exclusive property or privilege is claimed are defined as follows.

We claim:

1. A compound of the group consisting of basic esters of the formula

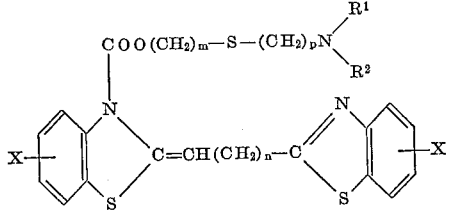

wherein $R^1$ and $R^2$ are substituents of the group consisting of hydrogen and alkyl of 1 to 20 carbon atoms, $n$ is an integer of 0 to 18, $m$ and $p$ are integers of 2 to 20, X is a substituent of the group consisting of hydrogen, chlorine, bromine, methyl, ethyl, isopropyl, methoxy, ethoxy, amino and nitro, and the citrate, maleate, stearate, oxalate, gluconate, gallate, butyrate, isovalerate, caproate, laurate, palmitate, oleate, linoleate, formate, acetate propionate, mineral acid, alkali metal, alkaline earth metal, ammonium chloride complex and lower alkyl halide quaternary ammonium salts thereof.

2. The compound of the formula

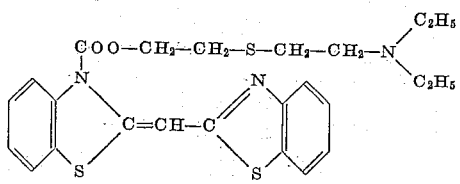

3. The compound of the formula

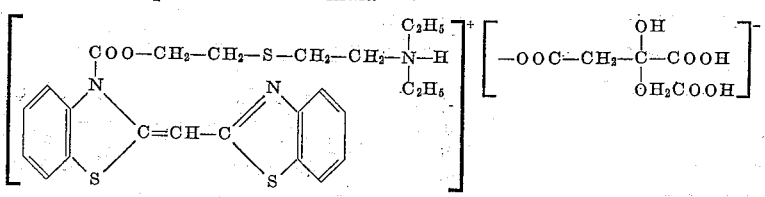

4. The compound of the formula

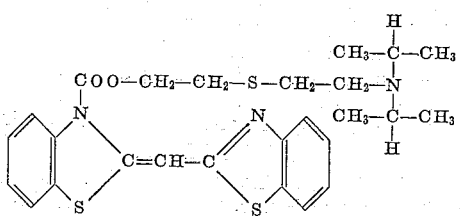

5. The compound of the formula

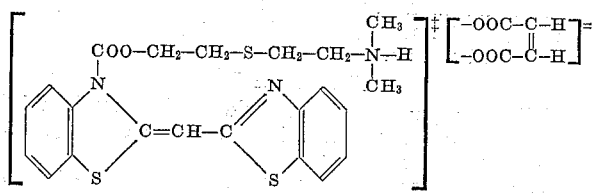

6. The compound of the formula

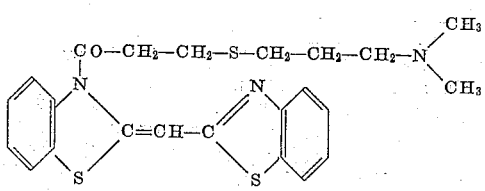

7. The compound of the formula

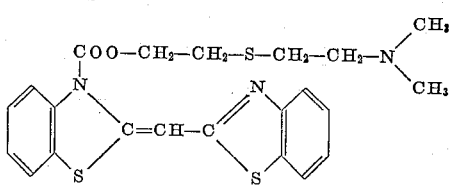

8. The compound of the formula

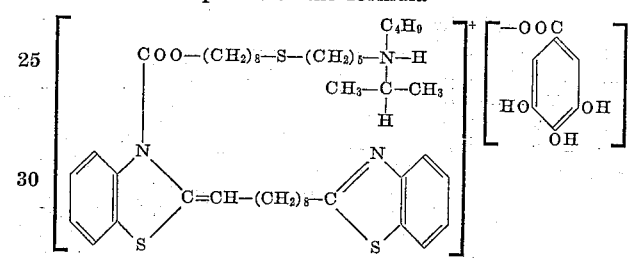

9. The compound of the formula

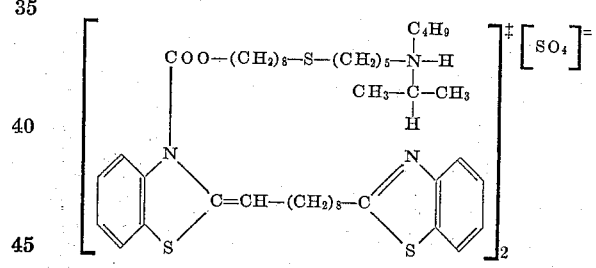

References Cited in the file of this patent

Nyilas et al.: J. Am. Chem. Soc., vol. 82, pp. 609–11 (1960).

Reid et al.: Liebig's Ann., vol. 599, pp. 44–50 (1956).

UNITED STATES PATENT OFFICE
CERTIFICATE OF CORRECTION

Patent No. 3,142,675            July 28, 1964

Charanjit Rai et al.

It is hereby certified that error appears in the above numbered patent requiring correction and that the said Letters Patent should read as corrected below.

Column 2, line 68, for "to" read -- at --; column 5, line 17, for "5′-(ami-" read -- 5′-ami- --; column 6, line 74, after "acetate" insert a comma; column 7, claim 3, for the right-hand portion of the formula reading same column 7, claim 5, for that portion of the formula reading

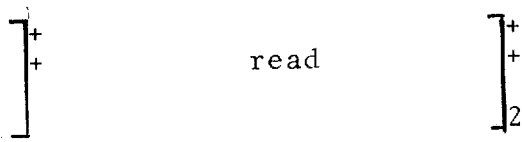

Signed and sealed this 8th day of February 1966.

(SEAL)
Attest:

ERNEST W. SWIDER
Attesting Officer

EDWARD J. BRENNER
Commissioner of Patents